United States Patent

[11] 3,557,960

[72] Inventors Hugh J. Fitzgerald
 Austin;
 Ernest H. Koepf, Dallas, Tex.
[21] Appl. No. 885,566
[22] Filed Dec. 16, 1969
[45] Patented Jan. 26, 1971
[73] Assignee Ocean Pollution Control, Inc.
 Dallas, Tex.
 a corporation of Texas. by mesne assignments

[54] OIL SKIMMING APPARATUS
 8 Claims, 2 Drawing Figs.
[52] U.S. Cl. .................................................... 210/242
[51] Int. Cl. .................................................... E02b 15/04
[50] Field of Search .......................................... 210/242,
 416, OWD; 65/1, 1F

[56] References Cited
 UNITED STATES PATENTS
1,397,892 11/1921 Jones............................ 210/OWD
3,221,884 12/1965 Muller.......................... 210/OWD
3,348,690 10/1967 Cornelissen.................. 210/OWD
3,358,838 12/1967 Kosar et al.................... 210/OWD Primary Examiner—Reuben Friedman
Assistant Examiner—C. M. DiHow
Attorney—Curtis, Morris and Safford ABSTRACT: Apparatus for removing a film of oil from a large body of water comprising a pair of generally similar funnel assemblies, one positioned behind and in the wake of the other with a harness for towing the same along their common central axis, each funnel assembly having an impermeable cover with spaced floats to support its wide leading edge above the water to capture the oil with the rest of the cover being supported on the floating oil, depending skirts at the tapered trailing edges of the cover to funnel the oil inwardly toward its apex, an enclosing sack of reinforcing netting covering the top and bottom of the apparatus, a sump to receive the oil from the apex of the rearward assembly, and a pump to transfer the oil from the sump to a storage barge.

PATENTED JAN 26 1971

3,557,960

INVENTORS
HUGH J. FITZGERALD
ERNEST H. KOEPF

BY
Curtis, Morris & Safford
ATTORNEYS

OIL SKIMMING APPARATUS

This invention relates to an apparatus for removing an oil film from the surface of a large body of water.

It is well known that when oil is released in or on a large body of water, because of the immiscibility of oil with water and the fact that oil is lighter than water, the oil rises to the surface of the water in the form of a film or slick which spreads to cover a large area and which is capable of migrating considerable distances depending upon the wind and the current. Where large quantities of oil are released, for example due to the sinking or damage of an oil tanker or to escape of oil under pressure through a fissure in an otherwise impermeable formation overlying an oil reservoir or in connection with an offshore drilling operation, movement of the oil slick to adjacent coastal areas can not only form an unsightly and messy residue on beaches, interfering with their recreational uses, but also have serious effects on aquatic birds, fish and other marine life, as well as other adverse ecological consequences.

Until recently there has been no effective means for confining and/or removing large oil films from open bodies of water. Attempts to use detergents and other chemicals to emulsify and/or disperse the oil have for the most part proven ineffective. On the other hand, attempts to confine the oil to a limited area to prevent its dispersion, for example by a chain of logs or elongated floats connected end to end in a circle, or to skim the oil from the surface by towing means such as a chain of between a pair of tugboats moving on parallel courses, have proved virtually worthless due to the fact that the surface of an ocean, bay or large inland lake is almost invariably subject to waves or choppiness which cause the oil film to be washed over the tops of the rigid floats so that most of the oil escapes.

In the copending application U.S. Ser. No. 811,713 filed Apr. 1, 1969, there is disclosed an apparatus for skimming an oil film from the surface of a large body of water including a towed funnel assembly with a flexible cover and side skirts of impermeable sheet material with floats to keep the leading edge of the cover spaced above the surface of the water so that the oil film will pass beneath it, with the remaining portions of the cover supported on the floating oil, a bottom panel of netting to hold the side skirts in downwardly projecting position to confine the oil laterally, while permitting the water beneath it to escape freely, and a sump at the apex of the funnel to receive the oil for transfer to a storage vessel. Tests of that apparatus indicated that it did an excellent job of removing floating oil under most surface conditions. However, in heavy seas or extreme choppiness, a minor portion of the oil inevitably washed over the tops of the funnel assembly and escaped. Nevertheless, a most interesting phenomenon was observed: Although the funnel assembly extends for only a few feet above and below the surface, it unexpectedly produced a marked effect in calming the surface motion, creating an area of "dead water" in its wake, Thus it was assumed that a second, similar funnel assembly towed in the wake of the first, within this "dead water" area, might perform much more efficiently than the first assembly and capture substantially all of any oil escaping from the first. Further tests with a comparable assembly confirmed this assumption.

The present invention exploits this phenomenon by providing a composite oil skimming apparatus having two generally similar funnel assemblies positioned one behind the other along the same central axis, so that the rearward assembly is in the "dead water" area in the wake of the forward assembly.

Figure 1:
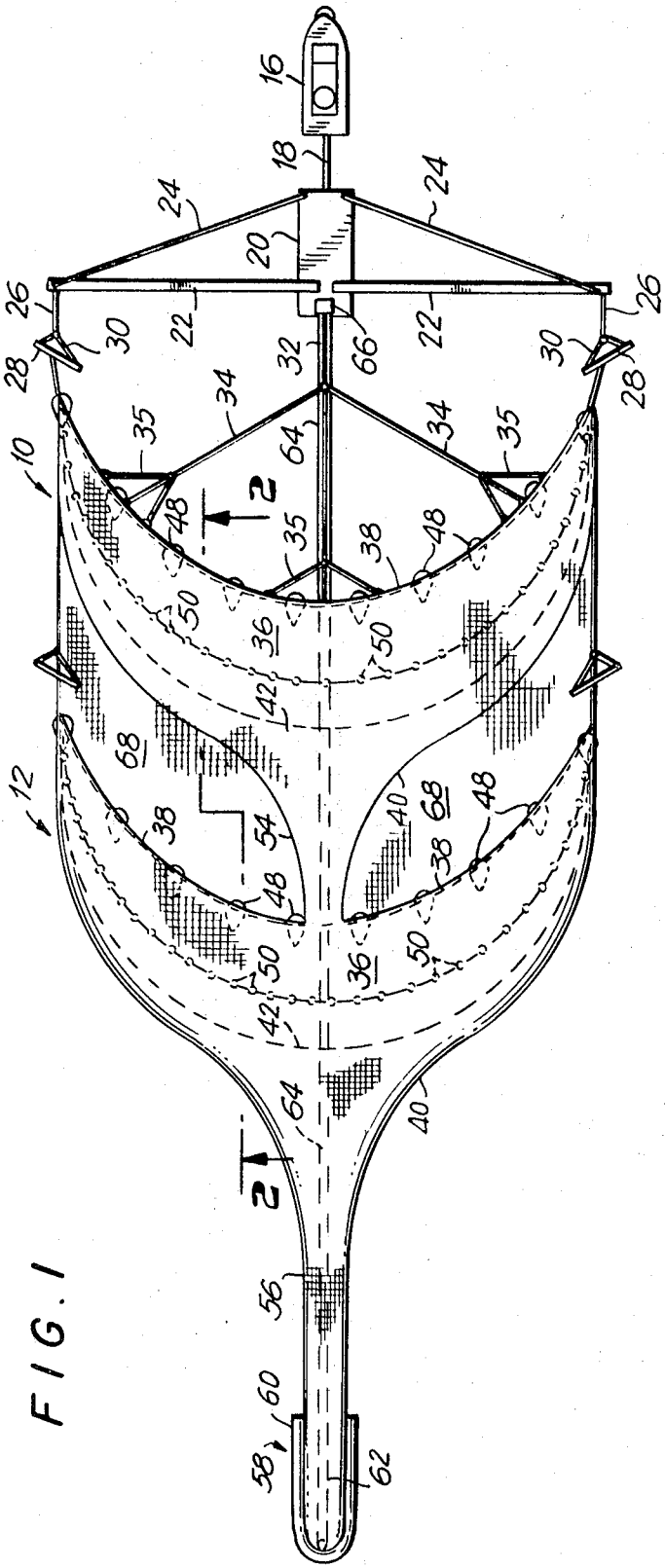
FIG. 1 is a diagrammatic top plan view of an illustrative apparatus embodying features of the present invention.

As may be seen in FIG. 1, the illustrative apparatus includes two generally similar funnel assemblies 10 and 12 arranged one behind the other along the same central axis, with a harness for towing the apparatus behind a tugboat 16 or other towing vessel. Positioned directly behind the tugboat 16 and connected thereto by a towline 18 is a storage barge 20 having projecting outwardly from opposite sides a pair of outrigger booms 22 braced by back stays 24 extending from the outer ends of the booms 22 forwardly and inwardly to the bow of the barge 20.

Extending rearwardly from the outer ends of the booms 22 are the outer lines 26 of the towing harness, which are connected to the opposite sides of the apparatus. Otter boards 28 are provided in the lines 26, with yokes 30 to keep the otter boards 28 angled outwardly so that, as the apparatus is towed, the drag of the otter boards is converted into an outwardly directed force at each side which keeps the apparatus extended laterally.

The harness may also include a centerline 32 with lateral branch lines 34, and each of these three lines may be divided into yokes 35 which distribute the pull along the leading edge of the apparatus.

Figure 2:
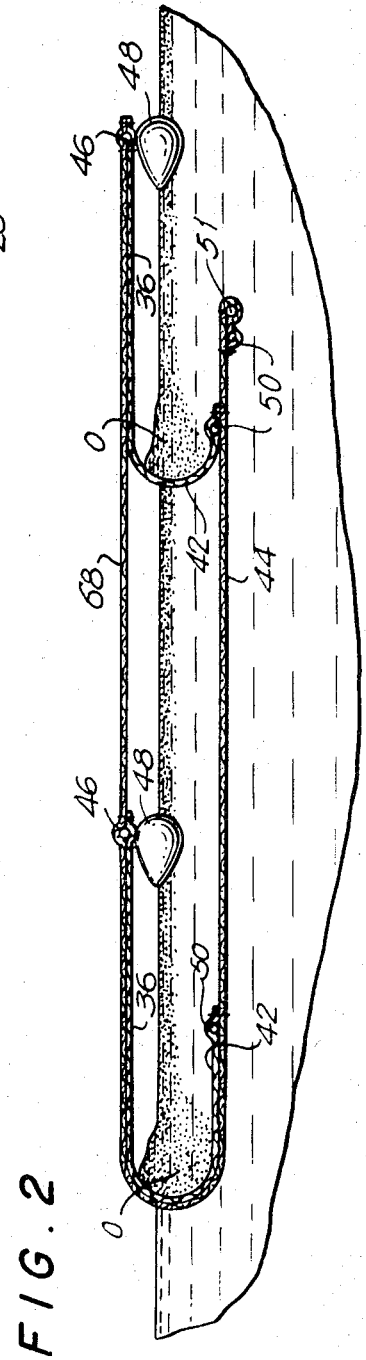
FIG. 2 is a vertical and longitudinal section taken on the line 2-2 of FIG. 1.

As best shown in FIG. 2, each of the two funnel assemblies 10 and 12 includes a cover 36 of flexible sheet material such as closely woven canvas, nylon or dacron which is impervious and impermeable to oil, having a tapered shape with a concave leading edge 38 of catenary shape and tapered trailing edges 40 from which depend skirt portions 42, with the lower edges of the skirt members 42 connected to the opposite edges of a bottom panel 44 of open material, such as gill netting, which extends across and encloses the bottom of the funnel assembly. The leading edge 38 of the cover is reinforced by a heavy rope 46 which is attached to and rests upon a series of floats 48 of such size as to keep the leading edge 38 spaced generally above the surface of the water an average distance of approximately 1 foot or more to insure that, as the funnel assembly is towed in a direction perpendicular to the leading edge 38, the floating oil O will pass beneath the leading edge 38 and along the bottom of the cover 36, with the trailing portions of the cover 36 being supported by the floating oil. The leading edge of the bottom-netting panel 44 is likewise reinforced by a heavy rope 51 carrying spaced weights 50 to keep it submerged. As the funnel assembly is towed, the substantial pressure of the oil and water against the tapered sides 40 of the funnel and the lesser drag of the bottom-netting panel 44 will maintain the flattened conical shape of the funnel, while its flexibility will permit it to conform readily and accurately to the changing surface of the water. The bottom-netting panel 44 limits outward movement of the skirt portions 42 and insures their downward extension for a sufficient depth, for example 2 to 6 feet, to entrap all of the oil which enters through the wide leading end of the funnel and prevent the escape of such oil with the water which is permitted to move freely through the bottom-netting 44 and out of the funnel.

The rearward funnel assembly 12 is generally similar in construction, with a tapered cover 36 having at its trailing edges depending skirt portions 42 connected at their lower edges to the bottom-netting panel 44 which extends across the intervening space between the two funnel assemblies. At the apex of the forward assembly 10 the cover 36 of the forward assembly is integrally attached to the cover 36 of the rearward assembly 12, by a neck portion 54 and the skirt portions 42 of the forward assembly are provided with an opening below this neck portion 54 so that the oil O captured by the first assembly will pass through this opening and beneath the cover 36 of the rearward assembly. Thus the rearward assembly 12 will receive all of the oil captured by the forward assembly plus substantially all of any oil which escapes over the top of the forward assembly in heavy seas or extreme choppiness. All of the oil captured by the rearward assembly is funneled inwardly and rearwardly to its apex, where the cover and skirt portions are formed into a fully enclosed conduit 56 which extends rearwardly to a sump 58. The sump 58 is enclosed in an inflated tubular float ring 60 which supports it at the surface and is enclosed above and below by top and bottom covers 62 of impermeable but flexible sheet material, formed with sufficient fullness to allow them to bulge outwardly as oil enters the sump, and thus provide a reservoir of considerable volume, and to collapse inwardly as oil is removed from the sump. A large diameter flexible pipe 64 formed, for example, of neoprene or similar material, extends forwardly from the sump 58 to a pump 66 on the storage barge for transferring the oil from the sump 58 to the storage barge 20 at substantially the same rate as it enters the sump, thus preventing filling the sump to its full capacity and allowing oil to backup in the conduit 56 and in the rearward funnel assembly to the point where oil would be forced downwardly beneath the skirt portion 42 of the rearward assembly and allowed to escape. A separating apparatus (not shown) may be provided on the barge 20 to separate any water collected with the oil so that the water may be discharged back into the body of water.

The apparatus may be reinforced by an outer panel of netting 68 which extends over the top of the entire assembly, overlying the covers 36 of the forward and rearward assemblies and spanning the space between them. The leading edge of this outer netting panel is attached to the reinforcing rope 46 at the leading edge 38 of the cover 36 of the forward assembly 10 and extends around behind the skirt portion 40 of the rearward assembly 12 and is attached to the trailing edge of the bottom-netting panel 44. Thus the entire apparatus is effectively enclosed in a sack of netting which not only reinforces it but aids in maintaining its proper shape.

As will be appreciated, this entire apparatus is lightweight and flexible so that it may be folded and coiled on a large roller, in the same manner in which the tarpaulins used to cover athletic fields are stored. It thus can be stored aboard ship in little space and easily transported to the desired location where it may be readily unrolled and extended for towing. The entire apparatus may be towed by a single vessel for optimum maneuverability, or by two vessels, one at each side, where extremely wide funnel assemblies are used. A relatively low towing speed, for example approximately 3 knots, is preferable to limit the stress on the apparatus. However, because of the considerable width of the apparatus—up to several hundred feet—a very large area of water can be swept in a short time.

Since the rearward funnel assembly 12 is operating in the "dead water" area in the wake of the forward assembly 10, it does an extremely efficient job of capturing any oil which escapes over or under the forward assembly. A spacing of approximately 5 to 25 feet between the skirt portion 42 at the trailing edge of the forward assembly 10 and the leading edge 38 of the cover 36 of the rearward assembly 12 is preferred to take best advantage of the calming effect of the first assembly.

We claim:

1. Apparatus for removing an oil film from a large body of water comprising a pair of laterally generally coextensive funnel assemblies positioned one behind the other along the same central axis, a harness for connecting said funnel assemblies to a towing vessel, with extender means for keeping said funnel assemblies extended laterally as they are towed by said vessel along said axis, each of said funnel assemblies including a cover of flexible sheet material impervious and impermeable to oil, having a tapered shape with a wide leading edge extending generally perpendicularly to said axis, and symmetrically tapered trailing edges, floats spaced along said leading edge to keep it generally spaced above the surface of the water as said assembly is towed, skirt portions extending downwardly from said trailing edges for a short distance under the water to trap the oil at the surface and channel it rearwardly and inwardly toward the apex of said funnel assembly, a bottom member freely permeable to water underlying said cover and secured to the lower edges of said skirt portions to limit their outward movement and thereby insure their extension downwardly into the water, an opening at the apex of the forward funnel assembly for allowing the oil trapped thereby to flow into the central portion of the rearward funnel assembly, a sump trailing behind the apex of the rearward funnel assembly and communicating therewith for receiving the oil trapped by sad said rearward funnel assembly flexible conduit means extending from said sump to a storage vessel, and pump means for moving the oil through said conduit means to said storage vessel.

2. Apparatus as described in claim 1 in which said extender means comprises otter boards with yokes for attaching said otter boards to said harness and maintaining them in an outwardly angled orientation whereby their drag is converted to an outwardly directed tension on the lateral ends of said funnel assemblies.

3. Apparatus as described in claim 1 in which said bottom members of each of said funnel assemblies is made of netting.

4. Apparatus as described in claim 3 in which a single bottom member of netting covers both the forward and rearward funnel assemblies and the space between them.

5. Apparatus as described in claim 1 in which the covers of said forward and rearward funnel assemblies are connected together along said central axis.

6. Apparatus as described in claim 1 in which a top-reinforcing member of netting interconnects said forward and rearward funnel assemblies.

7. Apparatus as described in claim 6 in which said top-reinforcing member extends over the cover members of both said funnel assemblies and downwardly around the skirt portion of said rearward funnel assembly and is attached to the trailing edge of the bottom member of said rearward assembly.

8. Apparatus as described in claim 1 in which a reinforcing sack of netting extends entirely around the top and bottom and the trailing edge of said apparatus, with the leading edge of the upper portion of said reinforcing sack being attached to the leading edge of the cover of the forward funnel assembly.

PO-1050
(5/69)

UNITED STATES PATENT OFFICE
CERTIFICATE OF CORRECTION

Patent No. 3,557,960              Dated January 26, 1971

Inventor(s) Hugh J. Fitzgerald and Ernest H. Koepf

It is certified that error appears in the above-identified patent and that said Letters Patent are hereby corrected as shown below:

Col. 1, line 27, after "chain of" insert --floats--.

Col. 3, line 13, after "The" and before "apparatus" insert --entire--.

Col. 4, line 20, after "trapped by" delete "sad".

Signed and sealed this 8th day of June 1971.

(SEAL)
Attest:

EDWARD M. FLETCHER, JR.          WILLIAM E. SCHUYLER,
Attesting Officer                Commissioner of Pate